(12) United States Patent
Gilson et al.

(10) Patent No.: US 10,371,051 B2
(45) Date of Patent: Aug. 6, 2019

(54) GAS TURBINE ENGINE NOISE REDUCING NOSE CONE

(71) Applicant: United Technologies Corporation, Hartford, CT (US)

(72) Inventors: Jonathan Gilson, West Hartford, CT (US); Nigel David Sawyers-Abbott, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 722 days.

(21) Appl. No.: 14/766,825

(22) PCT Filed: Feb. 13, 2014

(86) PCT No.: PCT/US2014/016196
§ 371 (c)(1),
(2) Date: Aug. 10, 2015

(87) PCT Pub. No.: WO2014/133770
PCT Pub. Date: Sep. 4, 2014

(65) Prior Publication Data
US 2016/0032832 A1    Feb. 4, 2016

Related U.S. Application Data

(60) Provisional application No. 61/771,208, filed on Mar. 1, 2013.

(51) Int. Cl.
*F01D 5/02* (2006.01)
*F01D 25/24* (2006.01)
*F02C 7/045* (2006.01)

(52) U.S. Cl.
CPC ............ *F02C 7/045* (2013.01); *F01D 5/02* (2013.01); *F01D 25/24* (2013.01);
(Continued)

(58) Field of Classification Search
CPC . F02C 7/045; F01D 5/02; F01D 25/24; F05D 2220/32; F05D 2220/36; F05D 2260/963
(Continued)

(56) References Cited

U.S. PATENT DOCUMENTS

| 2,853,852 A | * | 9/1958 | Bodine, Jr. ............ F02C 7/045 |
| | | | 137/15.1 |
| 3,794,444 A | | 2/1974 | Campbell et al. |

(Continued)

FOREIGN PATENT DOCUMENTS

| GB | 2 369 161 B | 11/2004 |
| GB | 2478312 | 9/2011 |

OTHER PUBLICATIONS

Engine data as provided in The Engine Handbook, 1991-2011, retrieved from. http://www.aircraftenginedesign.com/TableB2.html.*

(Continued)

*Primary Examiner* — Mark A Laurenzi
*Assistant Examiner* — Mickey H France
(74) *Attorney, Agent, or Firm* — Carlson, Gaskey & Olds, P.C.

(57) ABSTRACT

A fan section for a gas turbine engine includes a fan hub and a nose cone section operatively mounted to the fan hub. The nose cone section includes a noise attenuation feature.

7 Claims, 3 Drawing Sheets

(52) U.S. Cl.
CPC ...... *F05D 2220/32* (2013.01); *F05D 2220/36* (2013.01); *F05D 2260/963* (2013.01)

(58) Field of Classification Search
USPC ...................................... 415/119; 416/245 R
See application file for complete search history.

(56) References Cited

U.S. PATENT DOCUMENTS

| | | | |
|---|---|---|---|
| 3,819,009 | A | 6/1974 | Motsinger |
| 4,192,336 | A | 3/1980 | Farquhar et al. |
| 4,240,250 | A | 12/1980 | Harris |
| 4,379,191 | A | 4/1983 | Beggs |
| 4,723,626 | A | 2/1988 | Carr et al. |
| 4,817,756 | A | 4/1989 | Carr et al. |
| 4,909,346 | A | 3/1990 | Torkelson |
| 7,540,354 | B2 | 6/2009 | Morin et al. |
| 7,739,865 | B2 | 6/2010 | Prasad et al. |
| 2005/0060982 | A1* | 3/2005 | Mani ............... B64D 33/02 60/226.1 |
| 2006/0169532 | A1 | 8/2006 | Patrick |
| 2010/0215507 | A1 | 8/2010 | Breakwell |

OTHER PUBLICATIONS

Pratt and Whitney Turbofan, (no date), retrieved https://www.flightglobal.com/FlightPDFArchive/1958/1958-1-%20-%200927.PDF.*

U.S. Appl. No. 13/459,831, "A Gas Turbine Engine and Nacelle Noise Attenuation Structure," filed Apr. 30, 2012.

International Search Report for PCT Application PCT/US2014/016196 completed May 9, 2014.

International Preliminary Report on Patenability for PCT Application No. PCT/US2014/016196, dated Sep. 11, 2015.

Extended European Search Report for European Application No. 14756532.9 dated Oct. 6, 2016.

* cited by examiner

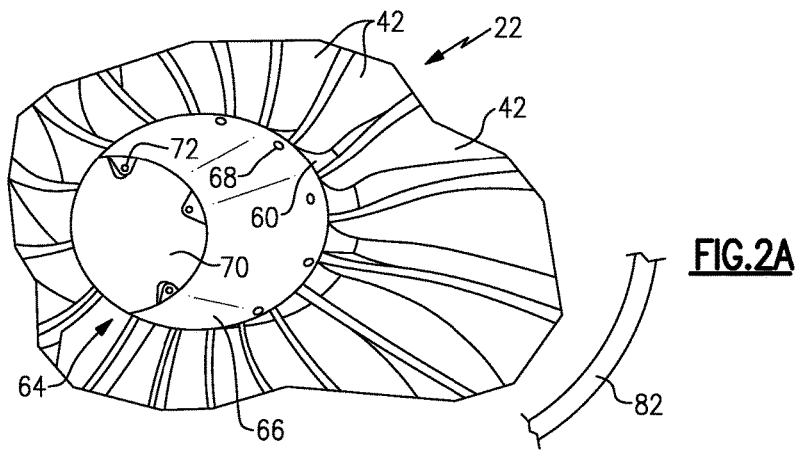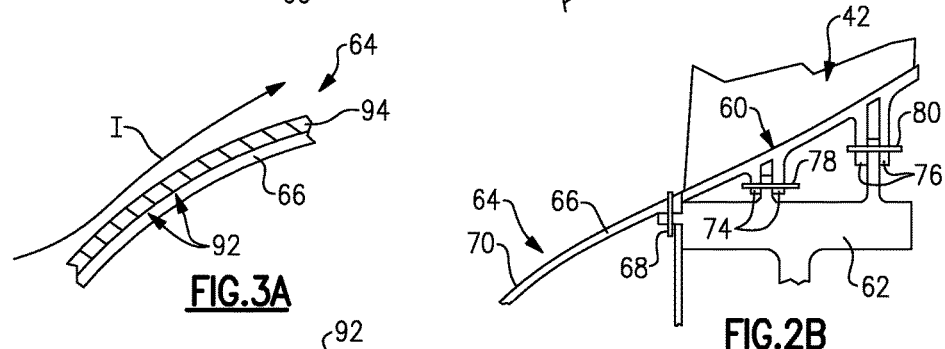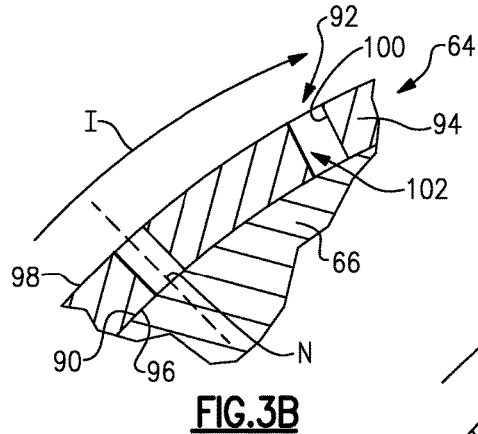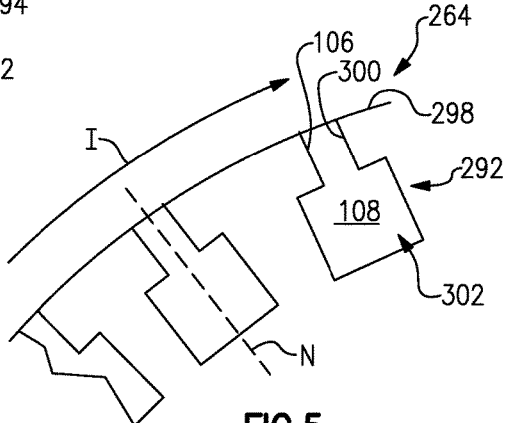

GAS TURBINE ENGINE NOISE REDUCING NOSE CONE

BACKGROUND

This disclosure relates to a fan section for a gas turbine engine. More particularly, the application relates to a nose cone noise attenuation feature.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large diameter fan blades. In high bypass ratio gas turbine applications using a fan drive gear system, fan noise can be a major source of overall engine noise. Higher bypass ratios mean larger fans with respect to the engine core components, and lower exhaust stream velocities exposing the fan noise sources more than other sources. Acoustic liners have been used in the fan nacelle upstream from the fan to reduce fan noise.

SUMMARY

In one exemplary embodiment, a fan section for a gas turbine engine includes a fan hub and a nose cone section operatively mounted to the fan hub. The nose cone section includes a noise attenuation feature.

In a further embodiment of the above, the noise attenuation feature includes discrete cavities in the nose cone section that provides a noise attenuation characteristic.

In a further embodiment of any of the above, the nose cone section includes a nose cone and a liner surrounding the nose cone. The noise attenuation feature includes perforations defining the cavities.

In a further embodiment of any of the above, the nose cone includes an exterior surface. The liner includes inner and outer surfaces. The inner surface is secured to the exterior surface. The cavities are provided in the liner.

In a further embodiment of any of the above, the nose cone section includes a nose cone. The cavities are shaped in part as a neck within the nose cone. Each of the cavities are in fluid communication with a secondary cavity. The neck has a smaller area than an adjoining area of the secondary cavity to provide a Helmholz resonator.

In a further embodiment of any of the above, the nose cone includes a perimeter. The liner circumscribes the perimeter.

In a further embodiment of any of the above, the liner is a seamless structure about the perimeter.

In a further embodiment of any of the above, a fan section for a gas turbine engine includes a fan nacelle. The nose cone section is provided within the fan nacelle. The fan nacelle has an inlet. A fan is arranged in the bypass flow path and is rotatable about an axis. The fan has a diameter and a leading edge is axially recessed from the nacelle inlet an inlet length. A ratio of the inlet length to the diameter is equal to or less than about 0.4.

In a further embodiment of any of the above, an acoustic liner is mounted on the fan nacelle upstream from the fan.

In another exemplary embodiment, a nose cone section for a gas turbine engine includes a nose cone including a noise attenuation feature that provides discrete cavities and provides a noise attenuation characteristic.

In a further embodiment of any of the above, the nose cone section for a gas turbine engine includes a liner that surrounds the nose cone. The noise attenuation feature includes perforations defining the cavities.

In a further embodiment of any of the above, the nose cone includes an exterior surface. The liner includes inner and outer surfaces. The inner surface is secured to the exterior surface. The cavities are provided in the liner.

In a further embodiment of any of the above, the cavities are shaped in part as a neck within the nose cone. Each of the cavities are in fluid communication with a secondary cavity. The neck has a smaller area than an adjoining area of the secondary cavity to provide a Helmholz resonator.

In a further embodiment of any of the above, the nose cone includes a perimeter. The liner circumscribes the perimeter.

In a further embodiment of any of the above, the liner is a seamless structure about the perimeter.

BRIEF DESCRIPTION OF THE DRAWINGS

The disclosure can be further understood by reference to the following detailed description when considered in connection with the accompanying drawings wherein:

FIG. 2A is a perspective view of a portion of a fan section having fan blades and discrete platforms.

FIG. 2B is a schematic cross-sectional view through a portion of the fan section shown in FIG. 2A.

FIGS. 3A and 3B schematically illustrate one example nose cone noise attenuation feature.

FIG. 3C schematically illustrates a seamless nose cone liner.

FIG. 5 schematically illustrates yet another embodiment of the nose cone attenuation feature.

DETAILED DESCRIPTION

Figure 1:
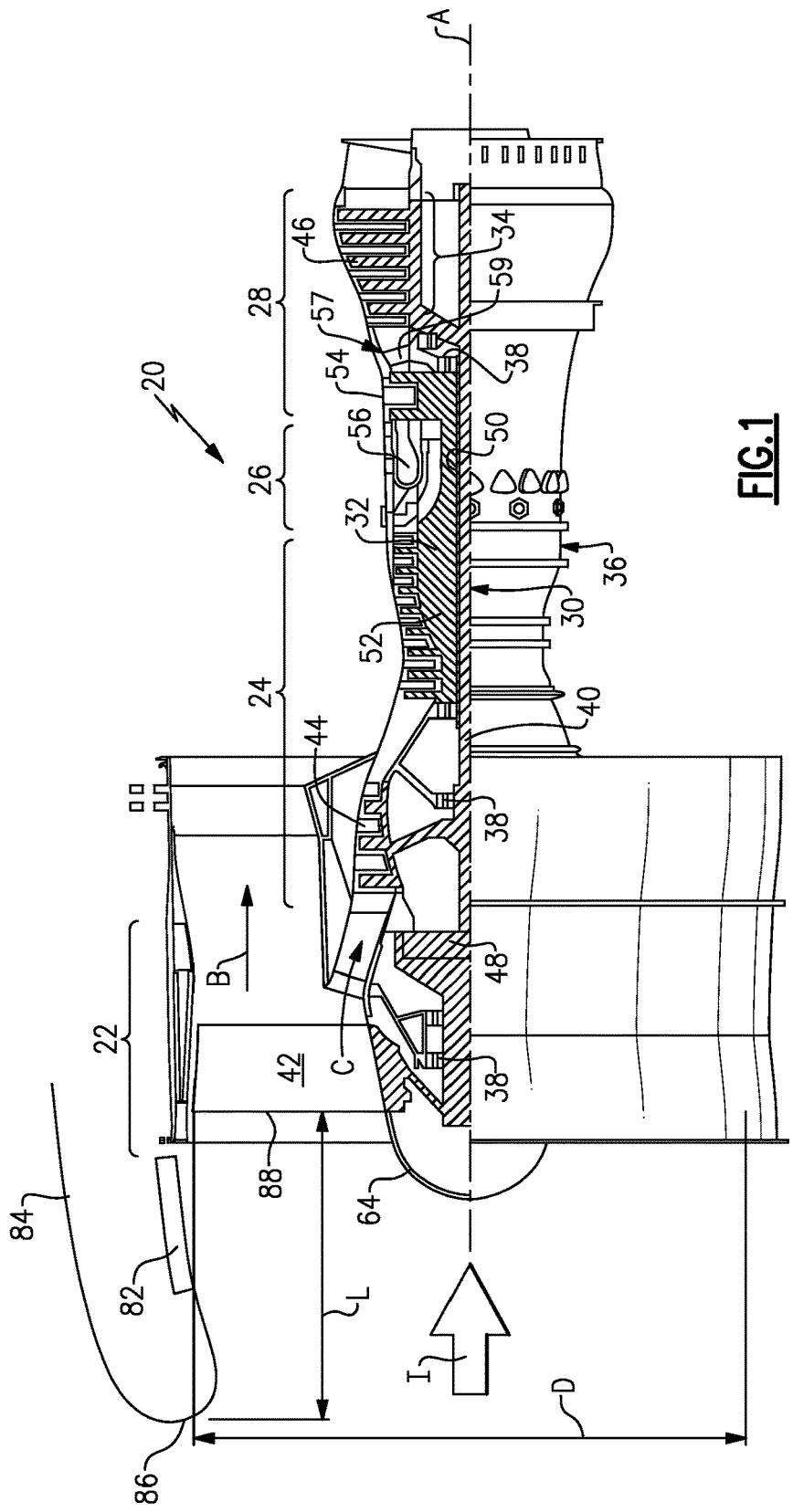
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The fan section 22 is shown in more detail in FIGS. 2A-2B. The fan section 22 includes multiple circumferentially arranged fan blades 42. In one example, the fan blades 42 include non-integral, discrete platforms 60, or spacers, arranged between adjacent fan blades 42. Referring to FIG. 2B, the fan blades 42 are mounted to a fan hub 62. A nose cone 64 is arranged forward of the fan blades 42 to provide an aerodynamic inner flowpath through the fan section 22 and along the platforms 60. The nose cone 64 is provided by a spinner 66 secured to the fan hub 62 by fasteners 68. A cap 70 is secured to the spinner 66 by fasteners 72. Alternatively, the cap 70 may be integrated with the spinner.

Referring to FIG. 2B, the platform 60 includes first and second pairs of flanges 74, 76 secured to corresponding attachment features, such as flanges, on the fan hub 62 respectively by fasteners 78, 80. The fasteners 68, 72, 78, 80 are schematically depicted in FIG. 2B by simple, thickened lines for clarity. Other platform configurations may be used.

Returning to FIG. 1, the engine 20 includes a fan nacelle 84 having a fan case liner 82. The fan case liner 82 is arranged upstream from the fan blades 42 and includes noise attenuation features, such as perforations in a thin-walled structure as set forth, for example, in U.S. Pat. No. 7,540,354 assigned to the Assignee of the present disclosure, and which is incorporated by reference in its entirety.

The fan nacelle 84 includes an inlet 86, which receives an inlet flow I. The fan blades 42 include a fan leading edge 88. The fan blades 42 have an outer diameter D. The fan leading edge 88 is axially spaced a length L from the inlet 86.

The nose cone 64 includes noise attenuation features, discussed below, which are particularly helpful in applications with low L/D ratios, for example, short inlets having an L/D less than 0.6. It should be understood that the disclosed nose cone noise attenuation features may also be used on larger L/D ratios.

Regarding the noise attenuation features, acoustic liners on a fan nacelle have provided significant attenuation for all fan source mechanisms. However, in the case of a short inlet there is more risk of inlet tones being generated by fan shock noise directly propagating out the inlet, that is, noise at supersonic conditions. There is also more risk of inlet distortion noise from a non-uniform inlet distribution interacting with the fan. As a result, noise may be more easily propagated to a far-field or near-field observer, that is airport community noise or airplane cabin noise. In the illustration, the nose cone 64 is at least partially aligned with the fan case liner 82 and supplements the noise attenuation provided by the fan case liner 82. As a result, a greater amount of fan noise may be attenuated.

In the example illustrated in FIGS. 3A-3C, the nose cone 64 includes an exterior surface 90. A liner 94 is secured to the exterior surface 90 surrounding the nose cone 64. The liner 94 has a thickness defined by the distance between inner and outer surfaces 96, 98 with the inner surface 96 adjacent the exterior surface 90. The nose cone 64, and in one example, the liner 94, includes noise attenuation features 92, which may correspond to passages 100 providing discrete volumes 102 from one another. The passages 100 may extend from the inner surface 96 to the outer surface 98 in the example such that the exterior surface acts as a backing plate that closes off one end of the volume. The passages 100 are oriented in a direction N, which is generally normal to the inlet flow I along the nose cone 64.

Figure 4:
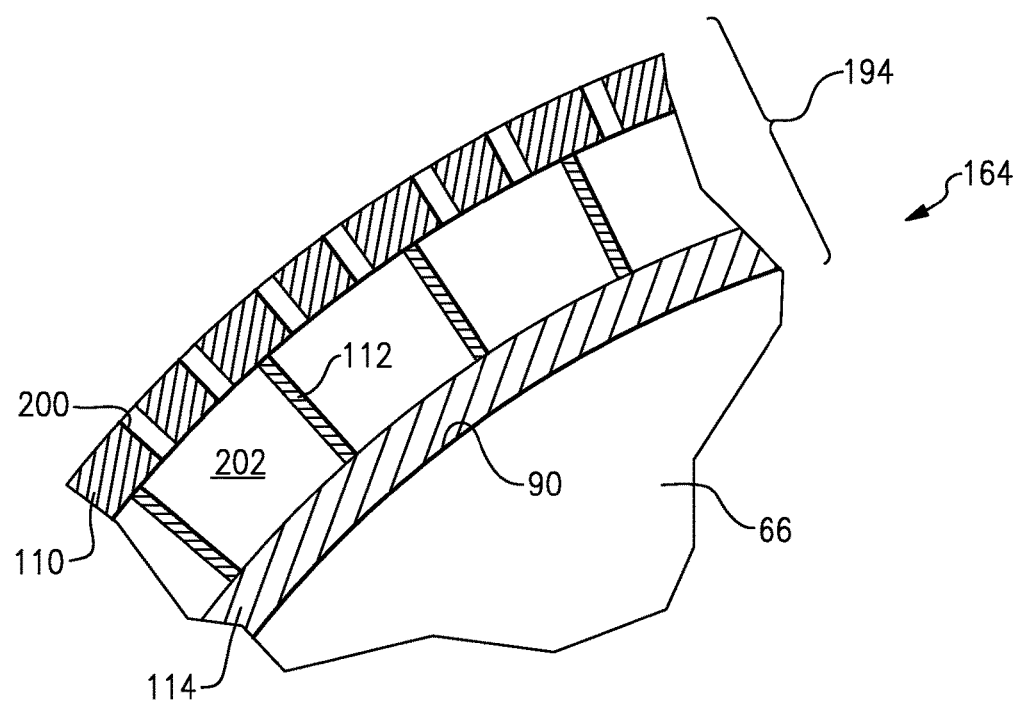
FIG. 4 schematically illustrates another embodiment of the nose cone attenuation feature.

A liner of the type described in U.S. Pat. No. 7,540,354 may be used, if desired, as shown in FIG. 4. The liner 194 includes spaced apart outer and inner sheets 110, 114. Partitions 112 are interconnected to the outer and inner sheets 110, 114 and provide the volumes 202. Passages 200 in the outer sheet 110 communicate fluid from the fluid flow path to the volumes 202. The inner sheet 114 is secured to the exterior surface 90 of the spinner 66 of nose cone 164.

Referring to FIG. 3C, the liner 94 is seamless and without any splices such that it extends 360° about a circumference 104 of the nose cone 64. In this manner, discontinuities are eliminated to minimize acoustic scattering, which can increase tone noise.

Another example embodiment is illustrated in FIG. 5. In the example, the noise attenuation feature 292 is provided by a Helmholtz resonator, which communicates fluid from the outer surface 298 through a passage 300 provided by a neck 106 into a cavity 108. The area of the neck 106 is smaller than an adjacent area of the cavity 108. The Helmholtz resonator provides the discrete volume 302, which may be provided by a liner or integrated into the nose cone 264 itself.

Although an example embodiment has been disclosed, one of ordinary skill in this art would recognize that certain modifications would come within the scope of the claims. For that reason, the following claims should be studied to determine their true scope and content.

What is claimed is:

1. A fan section for a gas turbine engine comprising;
a fan hub; and
a nose cone section operatively mounted to the fan hub, the nose cone section including a noise attenuation feature
comprising a fan nacelle, the nose cone section provided within the fan nacelle, the fan nacelle having an inlet, a fan arranged in a bypass flow path provided by the fan nacelle and rotatable about an axis, the fan having a diameter and a leading edge is axially recessed from the nacelle inlet an inlet length, and a ratio of the inlet length to the diameter of less than about 0.6,
wherein the noise attenuation feature includes discrete cavities in the nose cone section, providing a noise attenuation characteristic,
wherein the nose cone section includes a nose cone and the cavities are shaped in part as a neck within the nose cone, each of the cavities being in fluid communication with a secondary cavity, the neck having a smaller area than an adjoining area of the secondary cavity to provide a Helmholz resonator.

2. The fan section according to claim 1, wherein the nose cone section includes a nose cone and a liner surrounding the nose cone, and the noise attenuation feature includes perforations defining the cavities.

3. The fan section according to claim 2, wherein the nose cone includes an exterior surface, and the liner includes inner and outer surfaces, the inner surface secured to the exterior surface, and the cavities are provided in the liner.

4. The fan section according to claim 2, wherein the nose cone includes a perimeter, the liner circumscribing the perimeter.

5. The fan section according to claim 4, wherein the liner is a seamless structure about the perimeter.

6. The fan section according to claim 1, wherein an acoustic liner is mounted on the fan nacelle upstream from the fan.

7. The fan section according to claim 1, wherein the ratio is equal to or less than 0.4.

* * * * *